March 28, 1933. J. ZENZ ET AL 1,903,020
BRAKE TESTER
Filed Feb. 24, 1931
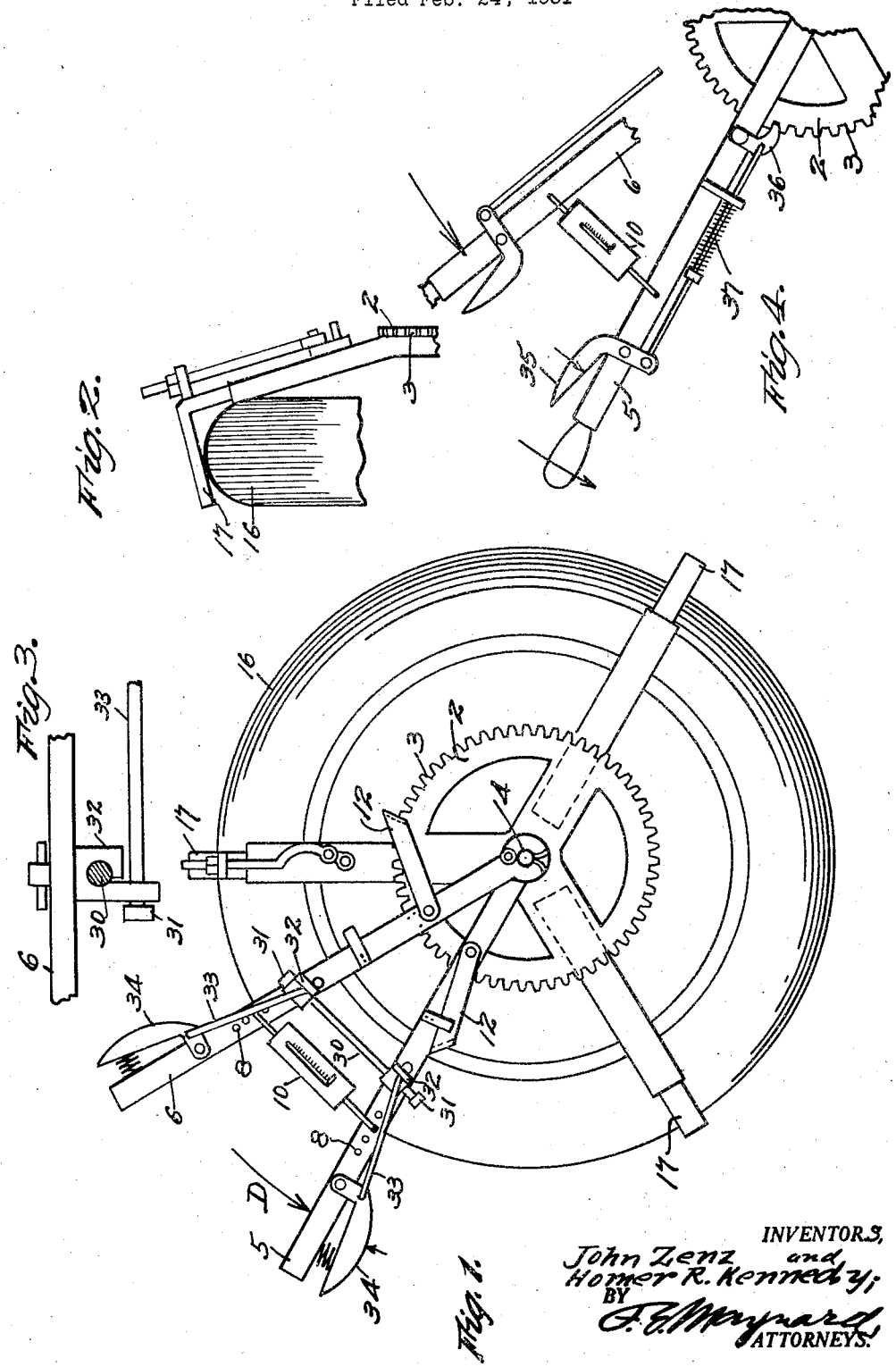
INVENTORS,
John Zenz and
Homer R. Kennedy;
BY
G. E. Maynard
ATTORNEYS.

Patented Mar. 28, 1933

1,903,020

UNITED STATES PATENT OFFICE

JOHN ZENZ AND HOMER R. KENNEDY, OF LOS ANGELES, CALIFORNIA; SAID ZENZ ASSIGNOR TO SAID KENNEDY

BRAKE TESTER

Application filed February 24, 1931. Serial No. 517,783.

This invention relates to apparatus for testing the resistance of a brake when set to hold a rotary part, such as a vehicle wheel.

The present improvement relates to the form of tester shown in our application S. N. 486,636, which discloses a pair of levers connected by an indicating scale to show degree of brake hold.

The instant embodiment includes means for initiating motion of the controlled part without effect on the indicator and then operative to permit functioning of the indicator under load of motion resistance by the moving part.

The invention consists of certain advancements in this art as set forth in the ensuing disclosure and having, with the above, additional objects and advantages, and whose construction, combination and details of means, and the manner of operation will be made manifest in the description of the herewith illustrative embodiments; it being understood that modifications, variations and adaptations may be resorted to within the scope, spirit and principle of the invention as it is more directly claimed hereinafter.

Figure 1 is a side elevation of the tool as applied to a left-side wheel of a vehicle.

Figure 2 is a detail showing a tire clamp of the device.

Figure 3 is a plan of a vice member of the tool.

Figure 4 is a side elevation of a modified form of the tool.

The tool includes a ratchet ring or disc 2 with rim teeth 3 and a central trunnion 4 on which is loosely journaled a pair of hand levers 5 and 6. Each lever has a series of perforations 8 and a spring scale 10 has end hitches hooked into opposite lever holes to connect the levers so that when power is transmitted from lever 5 to lever 6 to turn the disc, as by a latch 12, the effort will be indicated on the scale.

The disc has a set of grabs 17 to clinch onto the tire 16 of a wheel; controlled by a brake not shown.

It is well known that the effort to start a braked wheel is much greater than that required subsequently during motion of the wheel; such latter force being here called "resistance of motion" and which it is especially desired to measure for the true equalization of a set of brakes of a vehicle.

Therefore, means are here provided to start the wheel and to then bring the indicator into effect to show force needed to keep the wheel moving under brake effort.

In Fig. 1, a stiff bar 30 has stop heads 31 and is slidably mounted in a vice block 32 one of which is pivoted on each lever 5—6. Each block has a link rod 33 connected to and operative by a handle grip 34, of which one is pivoted on each lever 5 and 6; these being duplicate so that the tool can be used on either right side or left side wheels in place on a vehicle, at will. In use of this type of tool the operator closes the grip 34 of lever 5 and thus closes the vice thereof on the bar 30, and then pulls downward (arrow D) on the lever 5 so that the pull is transmitted by link bar 30 to the opposite lever 6. This prevents the scale 10 from taking the tension.

As soon as the disc and the clinched wheel turn then the operator releases the grip 34 of the lever 5 and therefore brings the scale 10 into function and this shows the power needed and used to continue rotation of the wheel, under brake friction, as this may be in effect all around or in spots on the brake drum, if the drum is out of true.

Figure 4 shows a modified form in which the levers 5—6 have a grip 35 connected to a dog 36 which is normally pressed open from the ratchet disc 2 by a suitable spring 37. Thus, the dog may be set against the disc to start rotation of the wheel, after which the grip 35 is released and the lever pull effort is transmitted by the scale 10 to the lever 6, the scale indicating the power needed to maintain rotation. Each lever 5 and 6 is equipped with a grip and dog 35—36, the dog being omitted in Fig. 4.

What is claimed is:

1. A brake tester having a pair of levers and a force indicator connecting them, and manually controlled means to provide for lever coaction without function of the indicator and including a lock device mounted on the levers and adapted to positively connect the levers at will.

2. A brake tester having a pair of levers, a manually controlled lock device for connecting the levers to effect concurrent lever action, and a force indicator connecting the levers and adapted to indicate effort on the levers when said device is released from manual control.

3. A brake tester of the class described and having pair of levers, a force indicator connecting the levers, and manually operative means to lock and operate the levers together without function of the indicator and releasable at will while the levers are in action to throw the indicator into effect.

4. A brake tester of the class described and having pair of levers, a force indicator connecting the levers, and manually operative means to lock and operate the levers together without function of the indicator and releasable at will while the levers are in action to throw the indicator into effect; said means including devices on the levers, operative according to direction of pull on the levers.

5. A brake tester of the class described and having pair of levers, a force indicator connecting the levers, and manually worked means to lock and operate the levers together without function of the indicator and releasable at will while the levers are in action to throw the indicator into effect; said means including a link, a clamp pivotally attached to each lever and slidably receiving the link, and a hand device on each lever to close the clamp according to direction of effort on the levers.

JOHN ZENZ.
HOMER R. KENNEDY.